United States Patent Office 3,489,700
Patented Jan. 13, 1970

3,489,700
PROCESS FOR PRODUCING A MULTICELLULAR SYNTHETIC RESIN STRUCTURE
Masanori Kanai, deceased, late of Ukyo-ku, Kyoto, Japan, by Tamae Kanai, inheritress, Ukyo-ku, Kyoto, Japan, and Norio Sagane and Isao Kaetsu, Takatsuki-shi, Japan, assignors to Sekisui Kagaku Kogyo Kabushiki, Osaka, Japan, a corporation of Japan
No Drawing. Filed Mar. 22, 1965, Ser. No. 441,926
Claims priority, application Japan, Mar. 23, 1964, 39/15,994; Mar. 24, 1964, 39/16,268
Int. Cl. C08f 47/10
U.S. Cl. 260—2.5                              8 Claims

ABSTRACT OF THE DISCLOSURE

An improved process for producing a multicellular synthetic resin structure having fine and uniformly distributed cells and superior mechanical strengths and heat resistance by very simple operations, said process comprising polymerizing a liquefied mixture consisting of at least 20% by weight of at least one kind of monomer selected from the group consisting of acrylamide, acrylic acid, methacrylamide and methacrylic acid and a foaming agent in an amount sufficient to foam the thermoplastic solid polymer produced from the polymerization of the liquefied mixture by generating a gas upon decomposition due to heating in the presence of a catalyst at a temperature below the decomposition temperature of said foaming agent until such thermoplastic solid polymer is produced, and heating said polymer to a temperature above the softening point of said polymer to thereby foam said polymer and form cross-linkages among the polymer molecules.

This invention relates to a process for producing multicellular structures of synthetic resins. More particularly, the invention relates to a process for producing multicellular structures of synthetic resins polymerized from at least one monomer selected from the group consisting of acrylamide, acrylic acid, methacrylamide and methacrylic acid.

Recently, utility of multicellular structures of synthetic resins has rapidly been broadened such as for construction and packaging materials because of their advantageous properties such as light weight, excellent thermal insulation and impact resistance. Also to meet with the ever increasing demand, researches on the multicellular structures performed notable developments, producing multicellular structures of widely differing developments, producing multicellular structures of widely differing characteristics.

These multicellular synthetic resin structures, however, each have their faults characteristic to the material synthetic resins. For example, polystyrene foams and polyvinylchloride foams have insufficient heat resistance. To wit, polystyreene foams cannot be used at temperatures higher than 80°–100° C., while polyvinylchloride foams, not above 100°–130° C. Phenol resin foams have good heat resistance, but have inferior mechanical strength.

Still further, foamed structures of acrylamide polymer are also known, but the processes for their preparation are complicated, and the properties of the so obtained products have not been found satisfactory for practical use.

The processes for producing multicellular structures of acrylamide polymer are disclosed, for example, in U.S. Patent No. 3,001,956 and German Patent No. 1,080,773. Briefly described, these processes comprise first adding a salt of a metal such as Fe, Cr, V, Ti, and Mn to an aqueous solution of acrylamide alone or containing acrylonitrile, acrylic acid or styrene added in an amount not in excess of 70 weight percent to the acrylamide, polymerizing this solution at a high temperature in the presence of a persulfate as catalyst, separating and washing the polymer formed, and thereafter foaming the resulting polymer by heating the same to a temperature ca. 170° C. under a high pressure of about two tons per square centimeter by means of, for instance, an extruder.

The above processes, however, have the following drawbacks. That is, in case of polymerizing acrylamide in an aqueous solution in the presence of a catalyst, troublesome and complicated operations are required such as precipitating the formed polymer in order to separate it from the solvent and the residual unreacted monomers, and washing the precipitated polymer to remove the acid, which has been used during polymerization for adjusting the acidity of the solution, and the other additives which adhere to the polymer. Further, as the polymer obtained as above is in the form of either a powder or irregular lumps, there is involved the inconvenience that in order to produce multicellular shaped articles by foaming and moulding this polymer, a very high pressure is necessary, as described hereinbefore. Moreover, not only are the cells of the so obtained multicellular structure coarse but also its mechanical strength and heat resistance were not entirely satisfactory.

Accordingly, it is an object of this invention to provide a process by which can be produced by very simple operations a multicellular structure having fine and uniformly distributed cells and superior mechanical strength and heat resistance, said structure comprising at least one polymer of acrylamide, acrylic acid, methacrylamide or methacrylic acid.

Other objects and advantages of this invention will become apparent from the following description.

The foregoing objects of the present invention are attained by the process of this invention for producing multicellular synthetic resin structures, which process comprises (1) mixing at least one monomer selected from the group consisting of acrylamide, acrylic acid, methacrylamide and methacrylic acid, with a foaming agent, and if necessary, with a monomer or monomers copolymerizable with the foregoing monomers, and foaming assistant of acid and/or liquid substance which can dissolve the said monomer or monomers and swell the polymer of the said monomer or monomers, to prepare a composition, (2) liquefying the composition, if the same substantially contains solid part, by heating or by adding a solvent such as water thereto, (3) polymerizing the composition in the presence of a suitable polymerization catalyst until at least the same becomes a thermoplastic solid polymer and (4) if desirable, further polymerizing the same by means of ionizing or photo radiation to such an extent that the polymer does not substantially lose its thermoplastic property, and (5) thereafter heating the solid polymer to a temperature above its softening point to soften the same, thereby to cause the formation of crosslinks between the polymer molecules of acrylamide, acrylic acid, methacrylamide or methacrylic acid and also the liberation of carbon dioxide gas or ammonia gas, while simultaneously foaming the polymer by the action of the gas from the solid polymer and the foaming agent present in the starting composition.

In the above, if the composition to be polymerized is obtained in liquid state, of course the liquefying step can be omitted, and the composition is polymerized.

The monomers contemplated in this invention, i.e., acrylamide, acrylic acid, methacrylamide and methacrylic acid, when polymerized alone or copolymerized with each other, predominantly polymerize linearly to form a solid polymer which is softenable by heating, or a thermoplastic solid polymer. Furthermore when the polymer as above obtained is heated above its softening point, the same always liberates ammonia gas or carbon dioxide gas and forms crosslinks between the polymer molecules to be converted into a three-dimensional polymer which has good heat resistance and no more softens upon heating.

The main components of the multicellular structures prepared in accordance with this invention are homopolymers of a monomer selected from the group consisting of acrylamide, acrylic acid, methacrylamide and methacrylic acid, copolymers of two or more of the above monomers, or copolymers of at least one of the above monomers with other known monomer or monomers copolymerizable therewith.

As such other monomers, there are a great number available, particularly suitable being the vinyl compounds such as styrene, methyl methacrylate, vinyl acetate, acrylonitrile, and the various acrylic acid esters. These preferred monomers, when copolymerized with at least one monomer of the group consisting of acrylamide, acrylic acid, methacrylamide and methacrylic acid, give the multicellular structures of better quality.

For example, the multicellular structure of the copolymer of acrylonitrile and acrylamide produced in accordance with the present invention, as compared with that of a homopolymer of acrylamide, is much more superior in water resistance as well as its mechanical strength. Likewise, by copolymerizing the monomer such as acrylamide according to this invention with acrylic acid esters, methacrylic acid esters, styrenes, etc. the multicellular structures are improved in water resistance. In addition, their degree of foaming becomes greater and the cells become finer.

It is also possible to use with advantage polyfunctional compounds having no less than two functional groups as the other monomers copolymerizable with acrylamide, acrylic acid, methacrylamide or methacrylic acid. Examples of particularly preferred polyfunctional compounds for the purpose are: diallyl phthalate, triallyl cyanurate, triallylamine, diallyl malate, diallyl succinate, diallylamine, diallyl citraconate, triallyl phosphonate, diallyl itaconate and triallyl aconitate. When such a polyfunctional compound is mixed in the composition comprising at least one of the monomer selected from the group consisting of acrylamide, acrylic acid, methacrylamide and methacrylic acid, and a foaming agent to form a liquid mixture and polymerized to a solid polymer by means of catalyst, the polyfunctional compound forms crosslinks between the molecules of the linear polymer of the said monomer or monomers. Therefore, care should be taken that the amount of the polyfunctional compound mixed should be such that as will retain the thermoplastic property of the product during the polymerization by catalyst of the liquid mixture to a solid polymer.

By the concurrent use of the polyfunctional compound, the degree of cross linkage in the polymer composing the multicellular structure can be increased as compared with the case wherein the polyfunctional compound is not used, and as the result cracking, deformation and shrinkage of the multicellular product can be reduced. Furthermore, the product also is imparted with improved strength, water resistance and heat resistance.

In this invention, normally the other copolymerizable component as above described is used in an amount not exceeding about 80 wt. percent of the resin forming components in the liquid mixture.

The foaming agent to be used in this invention may be any substance so far as it can be uniformly contained in said polymers or copolymers, and furthermore it decomposes or gasifies to liberate a gas at a temperature which does not differ greatly from the softening point of the polymer or copolymer in which the same is contained. Among such foaming agents, those which are particularly preferred, include itaconic acid, maleic anhydride, citric acid, trichloroacetic acid, urea, thiourea, dicyandiamide, chloral hydrate and phosphonitrile chloride.

The polymerization catalyst to be used in this invention may be any which is capable of polymerizing the monomer or monomers used, whereas redox-type catalysts such as the combinations of di-tertiary butyl peroxide, tertiary butyl hydroperoxide, and tertiary butyl peracetate, etc. with dimethylaniline and triethylamine, etc. are particularly preferred.

According to this invention, a mixture of monomer or monomers with a foaming agent as above described is catalytically polymerized in the presence of a polymerization catalyst to a heat-softenable, solid polymer.

We have previously proposed a process in which the monomer or monomers contemplated in this invention are either polymerized by radiation only in the absence of catalyst until a solid polymer results, or polymerized in the presence of catalyst until the product becomes a viscous liquid, followed by radiation polymerization until the liquid becomes a solid polymer, the polymer being thereafter subjected to the treatment same as in this invention.

This invention concerns with an improvement of the previously proposed process. In the said process the polymerization by catalyst is performed only to the extent that the product takes the form of a viscous liquid, and discontinued before it becomes substantially solid, which is found to be subject to following operational disadvantages.

(a) When the liquid product is irradiated, by the heat generated with the progress in the polymerization, such inconveniences as volatilization of monomer and localized foaming during the polymerization tend to occur, and the operational control is difficult in order to avoid the inconveniences.

(b) With the liquid system at its initial or middle stage of polymerization, progress of radiation polymerization is too violent, which tends to render the polymerization non-uniform, and objectionably influences the quality of the multicellular structure.

(c) Controlling of intensity and/or dosage of the radiation properly with the progress of the polymerization reaction in order to avoid such inconveniences as described in the above is in practice extremely difficult and industrially impractical.

Whereas, if the polymerization reaction is advanced by means of catalyst only until the product becomes a thermoplastic solid polymer, and thereafter optionally the last stage of the polymerization reaction is performed by means of radiation to the extent that the product does not substantially lose its thermoplasic property, such technical inconveniences inherent in the foregoing radiation of liquid system can be advantageously avoided.

Although it is known that such monomers as acrylamide, acrylic acid, methacrylamide and methacrylic acid are polymerized by means of light, heat, ultrasonic waves, catalyst or ionizing radiation, the reason why the polymerization is thus performed by means of catalyst in this invention is, as already explained, to avoid such inconveniences, as, that due to the polymerization heat the reaction system is given excessively high temperatures which causes such phenomena as volatilization and escape of monomer and localized foaming, and that the multicellular structures by foaming and moulding this polymer tend to show deformation which reduces their commercial value.

In this invention, it is not essential that the entire polymerization should be performed by means of catalyst. That is, the polymerization by catalyst is required until at least the product takes the form of a heat-softenable solid polymer. Thereafter, it is also possible to complete the polymerization by ionizing or photo radiation to an extent as will not substantially lose the thermoplastic property of the product, to form a thermoplastic solid polymer. In fact such completion of the polymerization by means of ionizing or photo radiation is rather advantageous. Because, generally in case of polymerization by catalyst, after the product polymer is solidified, a long time is required before the completion of the polymerization and therefore, radiation may be employed because the aforedescribed inconveniences no further take place, to shorten the polymerization time. Also multicellular structures obtained by means of ionizing or photo radiation have high degree of foaming, although the reason therefore is not yet clear.

And, it is desirable in this invention to also add a foaming assistant to the composition which comprises the starting monomer or monomers and a foaming agent. The foaminng assistant means such a substance which alone cannot foam the product polymer, but when used concurrently with the foaming agent, can raise the degree of foaming of the polymer to form excellent multicellular structures. As such foaming assistant, acids and inorganic or organic liquid substances which can dissolve the starting monomer or monomers and swell the polymer of monomer or monomers, are effective.

If acids are used as the foaming assistant, they have such actions as to promote decomposition of the foaming agent and furthermore to promote also the crosslinking reaction between the polymer molecules. Therefore when an acid is used as the foaming assistant, not only multicellular structure have high degree of foaming, but also because of the increased degree of crosslinking, the structure is improved as to its resistance to heat and water.

The function of the said liquid substances is not yet very clear, but probably because it lowers the viscosity of the thermoplastic polymer at the time of its foaming to render the foaming easier and also enables more uniform mixing of the foaming agent, the multicellular structures have the high degree of foaming.

Therefore, because the acids and the said liquid substances have common function of assisting the foaming, they are referred to in the above as foaming assistant, but their function and degree of effectiveness are not necessarily same. Examples of suitable foaming assistants include acids such as sulfuric, phosphoric, pyrophosphoric, oxalic, succinic, tartaric and fumaric acids and iodic anhydride, and the said liquid substances, such as water, formic acid and dimethylformamide.

Besides the foregoing, it is also possible in this invention to add to the composition fillers such as talc and lime.

The standard procedure for producing a multicellular structure in accordance with this invention is at follows: A homogeneous mixture is prepared by mixing together at least one monomer selected from the group consisting of acrylamide, acrylic acid, methacrylamide and methacrylic acid, a foaming agent, and if necessary, other monomer and monomers copolymerizable with the foregoing monomer and monomers and the acids, and the said liquid substances as the foaming assistant suitably selected. At that time, it is necessary in this invention that the so obtained mixture should be in liquid state in order to render the homogeneous mixing easier and to allow the polymerization catalyst to act on the mixture. For this purpose, the mixture may be heated to a temperature of the order as will not gasify nor decompose the foaming agent, to melt the mixture which may then be mixed with stirring. Alternatively, a small amount of the said liquid substance such as water may be added to render the mixture into a liquid substance which may then be mixed with stirring.

Thus obtained mixture is subsequently added with a polymerization catalyst, and the monomer or monomers therein are polymerized to a thermoplastic, solid polymer by a suitable means such as heating. As aforesaid, the monomer or monomers polymerize in this case predominantly linearly to form a solid polymer which however is softenable by heat. Then the thermoplastic solid polymer containing a foaming agent is heated as it is to high temperatures, say, ca. 200° C., without intervening operations such as washing and purification. The polymer softens and simultaneously the foaming agent contained therein volatilizes or decomposes and expands the polymer whereby the polymer becomes a multicellular structure. By further continuance of the heating the softened polymer liberates carbon dioxide or ammonia, and cross links between the molecules are formed, with the consequence that the polymer takes three-dimensional structure and is no more heat-softenable.

The heating for the foaming and crosslinking in accordance with this invention may be performed at atmospheric pressure, but it is desirable for obtaining better configuration of the resultant multicellular structure to perform the same under a very slightly elevated pressure such as 1 kg./cm.$^2$.

The multicellular structures obtained in accordance with the process of this invention have excellent heat resistance. For example, even when heated to 200° C., neither do they soften nor carbonize. Consequently, they can be used with no trouble whatsoever even in the condition of such an elevated temperatures. In addition, these multicellular structures have superior mechanical strength, their mechanical strength being greater than any of the conventionally known multicellular synthetic resin structures of equal density.

The following examples illustrate the nature of the invention but is not intended to limit it in any manner except as it is limited in the appended claims. In the example, all parts and percentages are by weight unless otherwise specified.

EXAMPLE 1

One hundred parts of acrylic acid and 30 parts of urea were mixed, and after addition thereto of 0.1% of potassium persulfate, the mixture was polymerized for about 20 hours at 60° C. to produce a solid thermoplastic polymer. Subsequently the polymer was heated to 200° C. under a pressure of 1 kg./cm.$^2$. A multicellular structure expanded by 10 times was obtained.

EXAMPLE 2

Forty parts of acrylamide, 100 parts of acrylic acid and 20 parts of urea were mixed, followed by addition thereto of 0.1% of potassium persulfate. As the result of subsequent treatments similar to those described in Example 1, a multicellular structure expanded by 15 times was obtained.

EXAMPLE 3

One hundred parts of acrylamide, 100 parts of acrylic acid, 80 parts of acrylonitrile, 60 parts of maleic anhydride and 10 parts of urea were mixed, and heated to 50° C. under stirring to form a liquid mixture. To the mixture then 0.5% of azo-bis-isobutylonitrile dissolved in a small amount of acetone was added, and the system was polymerized for about 40 hours at an elevated temperature of 60° C. A solid, thermoplastic polymer was obtained which, when heated to 200° C. under a pressure of 1 kg./cm.$^2$, formed a multicellular structure expanded by 27 times.

EXAMPLE 4

One hundred parts of acrylamide, 100 parts of acrylic acid, 100 parts of acrylonitrile, 60 parts of maleic anhydride, 50 parts of styrene, 50 parts of methyl methacrylate and 15 parts of urea were mixed, and heated to 50° C. under stirring to form a liquid mixture. To the mixture then 1% of tertiary butyl hydroperoxide and 1% of dimethylaniline were added, and the entire system was polymerized for 45 hours while its temperature was maintained at 40° C. A solid, thermoplastic polymer resulted which, when heated to 200° C. under a pressure of 1 kg./cm.$^2$, a multicellular structure expanded by 36 times was obtained.

EXAMPLE 5

One hundred parts of acrylamide, 100 parts of acrylic acid, 80 parts of acrylonitrile, 60 parts of maleic anhydride and 10 parts of urea were mixed, and heated to 50° C. under stirring to form a liquid mixture. To the mixture then 0.5% of azo-bis-isobutylonitrile dissolved in a small amount of acetone was added, and the entire system was polymerized for 20 hours at an elevated temperature of 60° C. to form a solid polymer. The polymer was then irradiated with $1.5 \times 10^6$ rep of gama rays having an intensity of $8 \times 10^5$ rep per hour irradiated from cobalt–60, whereupon a solid, thermoplastic polymer resulted. The same was obtained a multicellular structure expanded by 40 times, when heated to 200° C. under a pressure of 1 kg./cm.$^2$.

EXAMPLE 6

One hundred parts of acrylamide, 100 parts of acrylic acid, 100 parts of acrylonitrile, 60 parts of maleic anhydride, 50 parts of styrene, 50 parts of methyl methacrylate and 15 parts of urea were mixed and heated to 50° C. under stirring to form a liquid mixture. To the mixture, then 1% of tertiary butyl hydroperoxide and 1% of dimethylaniline were added, and the entire system was polymerized for 15 hours while its temperature was maintained at 40° C. to form a solid polymer. The same polymer was then irradiated with 2 ma. per second of beta rays having an energy 20,000 electron volt (mev.) irradiated from an electron beam generator for 30 seconds. A solid, thermoplastic polymer resulted which, when heated to 200° C. under a pressure of 1 kg./cm.$^2$, a multicellular structure expanded by 41 times was obtained.

EXAMPLE 7

One hundred parts of acrylamide, 100 parts of acrylic acid, 80 parts of acrylonitrile, 60 parts of maleic anhydride 50 parts of styrene, 50 parts of methyl methacrylate, 10 parts of triallyl cyanurate and 15 parts of urea were mixed, and heated to 50° C. under stirring to form a liquid mixture. To the mixture then 1% of tertiary butyl hydroperoxide and 1% dimethylaniline were added, and the entire system was polymerized for 15 hours while its temperature was maintained at 40° C. to form a solid polymer. Then the polymer was irradiated with $1.5 \times 10^6$ rep of gamma rays having an intensity of $8 \times 10^5$ rep per hour irradiated from cobalt–60, whereupon a solid, thermoplastic polymer resulted. When the thermoplastic polymer was heated to 200° C. under a pressure of 1 kg./cm.$^2$, a multicellular structure expanded by 35 times was obtained.

EXAMPLE 8

One hundred parts of acrylamide, 80 parts of itaconic acid and 20 parts of water were mixed, and to the mixture 0.1% of potassium persulfate was added. The system was maintained at 60° C. and polymerized for about 20 hours to form a solid thermoplastic polymer. Thereafter the so obtained thermoplastic polymer was heated to 200° C. under a pressure of 1 kg./cm.$^2$ to become a multicellular structure expanded by 20 times.

EXAMPLE 9

One hundred parts of acrylamide, 50 parts of methacrylic acid, 40 parts of urea and 20 parts of sulfuric acid were mixed, and to the mixture 0.1% of ammonium persulfate was added. The system was then polymerized for 28 hours at 40° C. to give a solid thermoplastic polymer. When the so obtained thermoplastic polymer was heated to 200° C. under a pressure of 1 kg./cm.$^2$, a multicellular structure expanded by 24 times resulted.

EXAMPLE 10

One hundred parts of acrylamide, 50 parts of methacrylic acid, 40 parts of urea and 20 parts of sulfuric acid were mixed, and to the mixture 0.1% of ammonium persulfate was added. The system was then polymerized for 15 hours at 40° C. to give a solid polymer, which was subsequently subjected to an irradiation of $1.5 \times 10^6$ rep of gamma rays having an intensity of $6 \times 10^5$ rep per hour irradiated from cobalt–60. A solid thermoplastic polymer resulted which, when heated to 200° C. under a pressure of 1 kg./cm.$^2$, a multicellular structure expanded by 38 times was obtained.

EXAMPLE 11

One hundred parts of acrylamide, 100 parts of acrylic acid, 100 parts of acrylonitrile, 60 parts of maleic anhydride and 15 parts of urea were mixed, and heated to 50° C. under stirring to form a liquid mixture. To the mixture then 1% of tertiary butyl peracetate and 1% of triethylamine were added and the entire system was polymerized for about 40 hours at 35° C. to give a solid thermoplastic polymer. When the so obtained thermoplastic polymer was heated to 200° C. under a pressure of 1 kg./cm.$^2$, a multicellular structure expanded by 33 times resulted.

EXAMPLE 12

One hundred parts of acrylamide, 70 parts of acrylic acid, 120 parts of acrylonitrile, 60 parts of maleic anhydride, 50 parts of styrene 50 parts of ethyl acrylate, and 15 parts of urea were mixed, and heated to 50° C. under stirring to form a liquid mixture. To the mixture then 0.5% of benzoyl peroxide dissolved in a small amount of acetone was added, and the entire system was polymerized for 40 hours while its temperature was maintained at 60° C. to form a thermoplastic polymer. When the so obtained thermoplastic polymer was heated to 200° C. under a pressure of 1 kg./cm.$^2$, a multicellular structure expanded by 30 times resulted.

EXAMPLE 13

One hundred parts of acrylamide, 100 parts of acrylic acid, 100 parts of acrylonitrile, 60 parts of maleic anhydride and 15 parts of urea were mixed, and heated to 50° C. under stirring to form a liquid mixture. To the mixture then 1% of tertiary butyl peracetate and 1% of triethylamine were added, and the entire system was polymerized for 15 hours at 35° C. to form a solid polymer. Then the polymer was irradiated with 2 m a. per second of beta rays having an energy of 2 mev. irradiated from an electron beam generator for 30 seconds. Thus a solid, thermoplastic polymer resulted which, when heated to 200° C. under a pressure of 1 kg./cm.$^2$, a multicellular structure expanded by 40 times was obtained.

EXAMPLE 14

One hundred parts of acrylamide, 100 parts of acrylic acid, 100 parts of acrylonitrile, 60 parts of maleic anhydride, 25 parts of urea and 25 parts of sulfuric acid were mixed, and heated to 50° C. under stirring to form a liquid mixture. To the mixture then 1% of di-tertiary butyl peroxide and 1% of dimethylaniline were added, and the entire system was polymerized for 28 hours while its temperature was maintained at 40° C. A solid thermoplastic polymer resulted which, when subsequently heated to 200° C. under a pressure of 1 kg./cm.$^2$, a multicellular structure expanded by 48 times was obtained.

EXAMPLE 15

One hundred parts of acrylamide, 100 parts of acrylic acid, 100 parts of acrylonitrile, 60 parts of maleic anhydride, 50 parts of styrene, 50 parts of methyl methacrylate, 30 parts of urea and 30 parts of sulfuric acid were mixed, and heated to 50° C. under stirring to form a liquid mixture. To the mixture then 1% of tertiary butyl hydroperoxide and 1% of dimethylaniline were added, and the entire system was polymerized for 30 hours while its temperature was maintained at 35° C. A solid thermoplastic polymer resulted which, when subsequently heated to 200° C. under a pressure of 1 kg./ cm.$^2$, a multicellular structure expanded by 50 times was obtained.

EXAMPLE 16

One hundred parts of acrylamide, 100 parts of acrylic acid, 100 puarts of acrylonitrile 60 parts of maleic anhydride, 50 parts of styrene, 50 parts of methyl methacrylate, 30 parts of urea and 30 parts of sulfuric acid were mixed, and heated to 50° C. under stirring to form a liquid mixture. To the mixture then 1% of tertiary butyl hydroperoxide and 1% of dimethylaniline were added, and the entire system was reacted for 15 hours at 35° C. to form a solid polymer. The polymer was thereafter irradiated with $8 \times 10^5$ rep of gamma rays having an intensity of $8 \times 10^5$ rep per hour irradiated from cobalt–60 to give a solid thermoplastic polymer. When the thermoplastic polymer was heated to 200° C. under a pressure of 1 kg./cm.$^2$, a multicellular structure expanded by 55 times was obtained.

EXAMPLE 17

One hundred parts of acrylamide, 100 parts of acrylic acid, 100 parts of acrylonitrile, 60 parts of maleic anhydride, 50 parts of styrene, 50 parts of methyl methacrylate, 30 parts of urea and 30 parts of sulfuric acid were mixed, and heated to 50° C. under stirring to form a liquid mixture. To the mixture then 1% of tertiary butyl hydroperoxide and 1% of dimethylaniline were added, and the entire system was polymerized for 13 hours while its temperature was maintained at 40° C. to yield a solid polymer. Then the polymer was irradiated with 2 ma. per second of beta rays having an energy of 2 mev. irradiated from an electron beam generator for 30 seconds. A solid thermoplastic polymer resulted which, when heated to 200° C. under a pressure of 1 kg./cm.$^2$, a multicellular structure expanded by 55 times was obtained.

EXAMPLE 18

One hundred parts of acrylamide, 100 parts of acrylic acid, 100 parts of acrylonitrile, 60 parts of maleic anhydride, 50 parts of styrene, 50 parts of methyl methacrylate, 30 parts of urea and 30 parts of sulfuric acid were mixed, and heated to 50° C. under stirring to form a liquid mixture. To the mixture then 1% of tertiary butyl hydroperoxide and 1% of dimethylaniline were added, and the entire system was polymerized for 20 hours while its temperature was maintained at 40° C. to form a solid polymer. The polymer was thereafter exposed directly to sunlight for 40 hours, and a solid thermoplastic polymer resulted. When the thermoplastic polymer was heated to 200° C. under a pressure of 1 kg./cm.$^2$, a multicellular structure expanded by 52 times was obtained.

EXAMPLE 19

One hundred parts of acrylamide, 100 parts of methacrylic acid, 100 parts of acrylonitrile, 60 parts of maleic anhydride, 50 parts of styrene, 50 parts of methyl methacrylate, 30 parts of urea and 30 parts of sulfuric acid were mixed, and heated to 50° C. under stirring to form a liquid mixture. To the mixture then 1% of tertiary butyl hydroperoxide and 1% of dimethylaniline were added, and the entire system was polymerized for 15 hours while its temperature was maintained at 40° C. to form a solid polymer. The polymer was subsequently irradiated with 2 ma. per second of beta rays having an energy of 2 mev. irradiated from an electron beam generator for 30 seconds, thereby a solid thermoplastic polymer was obtained. When the thermoplastic polymer was heated to 200° C. under a pressure of 1 kg./cm.$^2$, a multicellular structure expanded by 53 times resulted.

EXAMPLE 20

One hundred parts of acrylamide, 100 parts of acrylic acid, 100 parts of acrylonitrile, 60 parts of maleic anhydride, 50 parts of styrene, 50 parts of methyl methacrylate, 30 parts of urea, 30 parts of sulfuric acid and 10 parts of water were heated to 50° C. under stirring to form a homogeneous liquid mixture. To the mixture then 1% of di-tertiary butyl peroxide and 1% of triethylamine were added, and the system was polymerized for 43 hours while its temperature was maintained at 40° C. to form a solid thermoplastic polymer. When the so obtained thermoplastic polymer was subsequently heated to 200° C. under a pressure of 1 kg./cm.$^2$, a multicellular structure expanded by 52 times resulted.

EXAMPLE 21

One hundred parts of acrylamide, 100 parts of acrylic acid, 100 parts of acrylonitrile, 60 parts of maleic anhydride, 50 parts of styrene, 50 parts of methyl methacrylate, 30 parts of urea, 30 parts of sulfuric acid and 10 parts of water were mixed, and heated to 50° C. under stirring to form a homogeneous liquid mixture. Thereafter 1% of di-tertiary butyl peroxide and 1% of triethylamine were added to the mixture; and the system was polymerized for 18 hours at 40° C. to form a solid polymer. The polymer was then irradiated with $1 \times 10^6$ rep of gamma rays having an intensity of $8 \times 10^5$ rep per hour irradiated from cobalt–60, and thus a solid thermoplastic polymer was obtained. When the thermoplastic polymer was heated to 200° C. under a pressure of 1 kg./cm.$^2$, a multicellular structure expanded by 58 times resulted.

EXAMPLE 22

One hundred parts of acrylamide, 100 parts of acrylic acid, 100 parts of acrylonitrile, 60 parts of maleic anhydride, 50 parts of styrene, 50 parts of methyl methacrylate, 30 parts of urea, 30 parts of sulfuric acid, and 10 parts of water were mixed, and heated to 50° C. under stirring to form a homogeneous liquid mixture. To the same then 1% of di-tertiary butyl peroxide and 1% of triethylamine were added, and the system was polymerized for 16 hours while its temperature was maintained at 40° C. to form a solid polymer. The polymer was subsequently irradiated with 2 ma. per second of beta rays having an energy of 2 mev. irradiated from an electron beam generator for 30 seconds, whereupon a thermoplastic polymer was obtained. When the thermoplastic polymer was heated to 200° C. under a pressure of 1 kg./cm.$^2$, a multicellular structure expanded by 58 times resulted.

EXAMPLE 23

One hundred parts of acrylamide, 100 parts of acrylic acid, 100 parts of acrylonitrile, 60 parts of maleic anhydride, 50 parts of styrene, 50 parts of methyl methacrylate, 30 parts of urea, 30 parts of sulfuric acid and 10 parts of water were mixed, and heated to 50° C. under stirring to form a homogeneous liquid mixture. To the mixture then 1% of di-tertiary butyl peroxide and 1% of triethylamine were added, and the system was polymerized for 20 hours while its temperature was maintained at 40° C. to a solid polymer. The polymer was subsequently exposed directly to sunlight for 50 hours and so a thermoplastic polymer was obtained which, when heated to 200° C. under a pressure of 1 kg./cm.$^2$, gave a multicellular structure expanded by 54 times.

EXAMPLE 24

One hundred parts of acrylamide, 100 parts of acrylic acid, 100 parts of acrylonitrile, 60 parts of maleic anhydride, 50 parts of styrene, 50 parts of methyl methacrylate, 10 parts of diallyl phthalate, 30 parts of urea, 30 parts of sulfuric acid and 10 parts of water were mixed, and heated to 50° C. under stirring to form a homogenous liquid mixture. To the mixture then 1% of di-tertiary butyl peroxide and 1% of triethylamine were added, and the system was polymerized for 18 hours while its temperature was maintained at 40° C. The resultant solid polymer was irradiated with $1 \times 10^6$ rep of gamma rays having an intensity of $8 \times 10^5$ rep per hour irradiated from cobalt-60. A solid thermoplastic polymer was obtained which, when heated to 200° C. under a pressure of 1 kg./cm.², a multicellular structure expanded 42 times was obtained.

EXAMPLE 25

One hundred parts of acrylamide, 100 parts of acrylic acid, 100 parts of acrylonitrile, 60 parts of maleic anhydride, 50 parts of styrene, 50 parts of methyl methacrylate, 10 parts of diallyl malate, 30 parts of urea, 30 parts of sulfuric acid and 10 parts of water were mixed, and heated to 50° C. under stirring to form a homogeneous liquid mixture. To the mixture then 1% of di-tertiary butyl peroxide and 1% of triethylamine were added, and the system was polymerized for 16 hours while its temperature was maintained at 40° C. A solid polymer was thus obtained, which subsequently was irradiated with 2 ma. per second of beta rays having an energy of 2 mev. irradiated from an electron beam generator for 30 seconds. The resultant thermoplastic polymer formed, when heated to 200° C. under a pressure of 1 kg./cm.², a multicellular structure expanded by 43 times.

EXAMPLE 26

One hundred parts of acrylamide, 100 parts of acrylic acid, 100 parts of acrylonitrile, 60 parts of maleic anhydride, 50 parts of styrene, 50 parts of methyl methacrylate, 10 parts of triallylamine, 30 parts of urea, 30 parts of sulfuric acid and 10 parts of water were mixed, and heated to 50° C. under stirring to form a homogeneous liquid mixture. To the mixture then 1% of di-tertiary butyl peroxide and 1% of triethylamine were added, and the system was polymerized for 20 hours while its temperature was maintained at 40° C. A solid polymer thus obtained was then exposed directly to sunlight for 5 hours. The resultant thermoplastic polymer formed, when heated to 200° C. under a pressure of 1 kg./cm.², a multicellular structure expanded by 40 times.

EXAMPLE 27

One hundred parts of acrylamide, 100 parts of acrylic acid, 20 parts of urea, 20 parts of sulfuric acid and 5 parts of water were mixed, and to the mixture 0.1% of ammonium persulfate was added. The system was then polymerized for 18 hours while its temperature was maintained at 60° C. to form a solid thermoplastic polymer. When this polymer was heated to 200° C. under a pressure of 1 kg./cm.², a multicellular structure expanded by 38 times was obtained.

EXAMPLE 28

One hundred parts of acrylamide, 50 parts of itaconic acid, 20 parts of water and 5 parts of sulfuric acid were mixed, and to the mixture 0.1% of potassium persulfate was added. Then the system was polymerized for 16 hours while its temperature was maintained at 60° C. to form a solid thermoplastic polymer. When the so obtained thermoplastic polymer was heated to 200° C. under a pressure of 1 kg./cm.², a multicellular structure expanded by 22 times was obtained.

What is claimed is:

1. A process for producing a multicellular synthetic resin structure which comprises polymerizing a solution consisting of at least 20% by weight of at least one monomer selected from the group consisting of acrylamide, acrylic acid, methacrylamide and methacrylic acid and a foaming agent selected from the group consisting of itaconic acid, maleic anhydride, citric acid, trichloroacetic acid, urea, thiourea, dicyandiamide, chloral hydrate, and phosphonitrile chloride in an amount sufficient to foam the thermoplastic solid polymer produced from the polymerization of the solution by generating a gas upon decomposition due to heating in the presence of an organic catalyst capable of polymerizing said monomer selected from the group consisting of acrylamide, acrylic acid, methacrylamide, and methacrylic acid, at a temperature below the decomposition temperature of said foaming agent until such thermoplastic solid polymer is produced, and heating said polymer to a temperature above the softening point of said polymer to thereby foam said polymer and form cross-linkages among the polymer molecules.

2. A process according to claim 1, wherein said solid polymer resulted from polymerization is further subjected to ionizing radiation to such an extent that the polymer does not substantially lose its thermoplastic property.

3. The process according to claim 1 in which the liquefied mixture also comprises other monomer which is copolymerizable with the monomeric component of the mixture.

4. The process according to claim 2 in which the liquefied mixture also comprises other monomer which is copolymerizable with the monomeric component of the mixture.

5. The process according to claim 1 in which the polymerization catalyst is at least one compound selected from the group consisting of di-tertiary butyl peroxide, tertiary butyl hydroperoxide and tertiary butyl peracetate, used in combination with at least one compound selected from the group consisting of dimethylaniline and triethylamine.

6. The process according to claim 2 in which the polymerization catalyst is at least one compound selected from the group consisting of di-tertiary butyl peroxide, tertiary butyl hydroperoxide and tertiary butyl peracetate, used in combination with at least one compound selected from the group consisting of dimethylaniline and triethylamine.

7. The process according to claim 3 in which the other monomer which is copolymerizable with at least one monomer selected from the group consisting of acrylamide, acrylic acid, methacrylamide and methacrylic acid is at least one substance selected from the group consisting of styrene, methyl methacrylate, vinyl acetate, acrylonitrile, diallyl phthalate, triallyl cyanurate, triallylamine, diallyl maleate, diallyl succinate, diallylamine, diallyl citraconate, triallyl phosphonate, diallyl itaconate and triallyl aconitate.

8. The process according to claim 4 in which the other monomer which is copolymerizable with at least one monomer selected from the group consisting of acrylamide, acrylic acid, methacrylamide and methacrylic acid is at least one substance selected from the group consisting of styrene, methyl methacrylate, vinyl acetate, acrylonitrile, diallyl phthalate, triallyl cyanurate, triallylamine, diallyl maleate, diallyl succinate, diallylamine, diallyl citraconate, triallyl phosphonate, diallyl itaconate and triallyl aconitate.

References Cited

UNITED STATES PATENTS

| 3,098,832 | 7/1963 | Pooley et al. | 260—2.5 |
| 3,138,478 | 6/1964 | Hedman et al. | 260—2.5 |
| 1,981,722 | 11/1934 | Ditmar | 260—2.5 |
| 2,990,381 | 6/1961 | Meinel | 260—2.5 |
| 3,001,956 | 9/1961 | Meinel. | |
| 3,090,761 | 5/1963 | Backlund et al. | |

FOREIGN PATENTS 1,368,383  6/1964  France.

MURRAY TILLMAN, Primary Examiner

J. C. BLEUTGE, Assistant Examiner

U.S. Cl. X.R.

204—159.14; 260—78.5, 80, 80.3, 80.73, 80.8, 85.5, 85.7, 86.1, 87.3, 88.1, 89.7, 80.72